United States Patent [19]

Donn

[11] Patent Number: 4,473,514

[45] Date of Patent: Sep. 25, 1984

[54] PROCESS FOR THE MANUFACTURE OF STEEL BALLS, PARTICULARLY BALLS FOR ROLLING ELEMENT BEARINGS

[75] Inventor: Vittorio Donn, Turin, Italy

[73] Assignee: RIV-SKF Officine di Villar Perosa S.p.A., Turin, Italy

[21] Appl. No.: 513,338

[22] Filed: Jul. 13, 1983

[30] Foreign Application Priority Data

Jul. 13, 1982 [IT] Italy ................. 67886 A/82

[51] Int. Cl.$^3$ .................................... B29C 6/00
[52] U.S. Cl. .................................... 264/12; 75/0.5 C; 264/13; 264/14
[58] Field of Search ............. 75/0.5 B, 0.5 BA, 0.5 C; 264/11, 12, 13, 14

[56] References Cited

U.S. PATENT DOCUMENTS

| | | | |
|---|---|---|---|
| 2,978,742 | 4/1961 | Bliemeister | 264/13 |
| 3,677,669 | 7/1972 | Bliemeister | 264/13 |
| 3,719,733 | 3/1973 | Rakestraw et al. | 264/13 |
| 4,035,116 | 7/1977 | O'Brien et al. | 264/13 |

Primary Examiner—W. Stallard
Attorney, Agent, or Firm—Shlesinger, Arkwright, Garvey & Fado

[57] ABSTRACT

The process comprises at least a first phase for separating a plurality of particles of molten steel from a bath of molten steel, a second phase for subjecting these particles, while still in the fluid state, to a first system of forces acting on the outer surface of each of the said particles and to a second system of forces acting on each element of the body of each particle, the said two systems of forces being chosen in such a way that these forces tend to impart a substantially spherical form to each of the said particles, and a third phase for removing heat from the said particles sufficient to bring them substantially to the solid state.

7 Claims, 5 Drawing Figures

PROCESS FOR THE MANUFACTURE OF STEEL BALLS, PARTICULARLY BALLS FOR ROLLING ELEMENT BEARINGS

BACKGROUND OF THE INVENTION

The present invention relates to a process for the manufacture of steel balls, particularly balls of small and medium dimensions for rolling element bearings, by means of which the balls can be produced by employing a significantly smaller quantity of energy than that necessary with conventional processes, and utilising apparatus and installations which are very much simpler and easier to operate than those required in known processes.

As is known, the production of steel balls for rolling element bearings involves a process which comprises very many phases both of a metallurgical character, for the preparation of blanks (ingots) suitable for subsequent working, and by hot mechanical working to obtain steel rod from the ingots, and by cold mechanical working to convert the steel rod into balls.

The molten steel is first cast into ingots from which, by means of hot rolling, there are successively obtained blooms, billet, bars and rods. From this latter, by means of cutting and pressing on presses of a special type, blanks delimited by two caps having spherical surfaces, separated by an annular projection contained in a diametral plane are obtained. These blanks are then worked by means of an operation to remove shavings or chips on suitable shaping machines to remove the said annular projections from them, treated in rotating drums to obtain more regular surfaces, and then ground first for roughing out and then finishing on special grinding machines, for the purpose of obtaining balls with good tolerances in their shape and dimensions. Subsequently the balls are subjected to heat treatments for hardening and tempering and to further working by way of grinding for finishing and polishing.

It is apparent that the phases of the process described require a large quanity of energy both because the form which is imparted to the blanks in the successive working phases is obtained by removing material from the blank obtained in the preceding phase or by modifying its shape by the application of pressures and/or high temperatures, and because some of these phases must be performed hot or require significant forces for causing plastic deformation or for removing material.

Now, The apparatus and installations required to undertake all these phases are complex and expensive and require particularly skilled operators for operating them. Consequently the cost of production of balls using the described process is rather high. Moreover, in the balls thus obtained there is a certain anisotropy in the material, especially in the outermost layers of each ball, due to the phase of cold plastic deformation by which the cylindrical blank is converted to an approximately spherical form. This anisotropy is manifested in the form of oriented fibres deriving from the orientation of the fibres in the rod, which remain in the spherical form and which results in the formation of poles. This anisotropy of the structure gives rise to an asymmetric distribution in the Hertzian stresses when a load is applied to the ball.

SUMMARY OF THE INVENTION

The object of the present invention is that of providing a process for the manufacture of steel balls, particularly balls for rolling element bearings, with which the above mentioned disadvantages of the first described conventional process are eliminated.

Another object of the invention is that of providing a process at the end of which the balls are obtained already hardened without it being necessary to subject then to further hardening treatments.

According to the invention there is provided a process for the manufacture of steel balls, in particular balls for rolling element bearings, characterized by the fact that it comprises at least a first phase for separating a plurality of particles of molten steel from a bath of molten steel, a second phase for subjecting the said particles, while still in the fluid state, to a first system of forces acting on the outer surface of each of the said particles and a second system of forces acting on each element in the body of each particle, the said two systems of forces being selected in such a way that the forces tend to impart a substantially spherical form to each said particle in the fluid state, and a third phase for removing heat from said particles sufficient to bring them substantially to the solid state whilst they have the said substantially spherical form, the said phase for removing heat from the said particles being effected in a very short time while the said particles have the said substantially spherical form.

BRIEF DESCRIPTION OF THE DRAWINGS

For a better understanding of the method of the invention, the fundamental phases of the process will now be described with reference to the attached drawings, in which.

DETAILED DESCRIPTION OF THE INVENTION

For the performance of the process of the invention a bath of molten steel, obtained in any convenient manner, is utilised, and from this bath, in a first phase of the process, a plurality of particles of molten steel are separated, each of which is to be converted in the subsequent phases of the process into a steel ball. Separation of the said particles from the mass of molten steel can be obtained in several ways. The first way consists in making the molten steel flow in an intermittent manner through orifices of predetermined dimensions by free fall in such a way as to form a rain of drops of molten steel which are allowed to fall in a space in which the physical and chemical conditions are maintained in such a way that each particle of molten steel remains in its molten condition.

Figure 1:
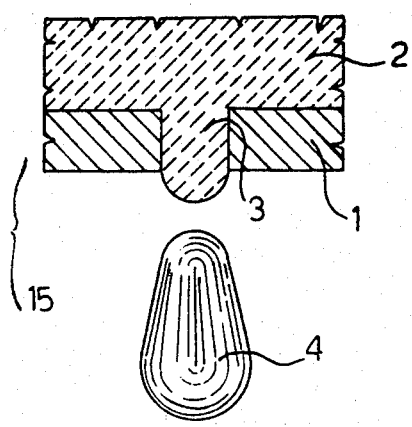
FIGS. 1, 2 and 3 schematically represent the configurations which three blanks from which balls are obtained adopt at the end of the first, second and third phase of the process respectively.

In this way, schematically illustrated in FIG. 1, a plurality of orifices 3 having prededetermined dimensions are formed in a wall 1 of a bath 2 of molten steel, and through these orifices the molten steel flows, giving rise to particles 4, each of which separate as a drop from the remaining mass of material under the action of the pressures which act on the mass itself, and the surface tension which tends to isolate the particles from this mass progressively as they traverse the orifice 3.

These orifices 3 can form part of a screen through which the mass of molten steel is made to flow, on which a predetermined pressure can act.

The molten particles can also be obtained in various alternative ways, some of which are now described.

Figure 4:
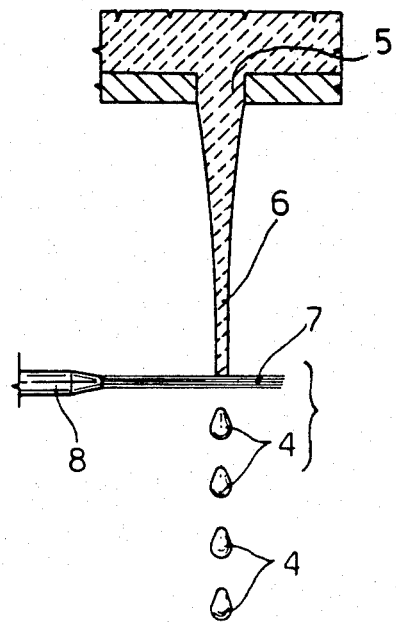
FIG. 4 schematically represents an alternative way of performing the first phase of the process.

From the bath of molten steel a continuous and free flow of molten steel can be formed, having a predetermined rate of flow, by making the molten steel flow through holes 5 (FIG. 4) having a predetermined section, formed in a wall of the bath as has been schematically represented in FIG. 4. In this way the molten steel gives rise to a continuous flow 6 and along the path of this flow there is formed a separation of the flow itself into a plurality of particles 4 obtained by suitable separation means. Such means can be constituted by jets 7 of a fluid under pressure, for example gas, intermittently directed onto the continuous flow 6 by means of suitable nozzles 8 as has been shown in FIG. 4; alternatively, such means can be constituted by laser beams generated in an intermittent manner from a suitable source, or such separation can be obtained by means of a mechanical separator tool which is introduced cyclically into the path of the fluid flow for the purpose of separating it into particles 4.

Figure 5:
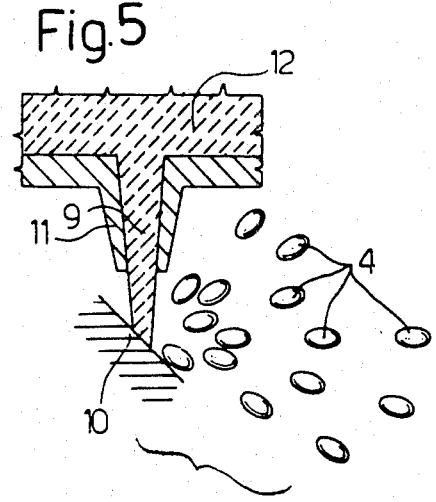
FIG. 5 schematically represents a further alternative way of performing the first phase of the process.

Another way of obtaining the particles 4 may comprise conveying a current of molten steel 9 (FIG. 5) having high energy against suitable surfaces, for example, a surface 10 which is inclined with respect to the direction of the flow, in such a way that following the impact the stream of molten steel is separated into a plurality of particles 4. In this case the stream 9 which must be provided with high kinetic energy and pressure can be supplied through ducts 11 and subjected to the action of a high pressure generated in the body 12 of molten steel.

Finally, a plurality of particles can be separated from the body of molten steel by liberating, in any manner and in a very short time, a predetermined energy within this body, in such a way that an actual explosion takes place within the said body to form particles.

When each particle 4 is separated from the body of molten steel, for example in the manner illustrated in FIG. 1, it assumes a non-spherical form depending on the overall body and surface forces which act on it. For example, in the case of the particle 4 which separates in the form of a drop from the material which traverses the orifice 3 of FIG. 1, the droplet form of this particle is obtained by the equilibrium between the forces of weight applied to each element of the body of the particle itself (body forces) which tend to displace each element in a vertical direction and therefore to make the droplet assume an elongate form, and the forces due to the surface tension, directed orthogonally with respect to the surface of the droplet and which tend instead to make this surface assume a spherical form; it the droplet falls through a gas other surface forces act on the particle due to the aerodynamic action of this gas on the surface itself.

In the method of the present invention, whilst the particles 4 separate from the mass of molten steel and move in the space 15 there must be maintained in this space such physical and chemical conditions that the steel of the particles themselves remains molten and therefore, in particular a very high temperature must be maintained.

In a second phase of the method the particles 4 are subjected to a first system of forces acting on the outer surface of each of these and to a second system of forces acting on each element of the body of the particle itself, and these two systems are chosen in such a way that the forces tend to impart a substantially spherical form to each particle.

The choice of the said two systems of forces depends on the manner in which the particles 4 have been generated in the preceeding phase, and on the speed and trajectory of the particles themselves.

Figure 2:
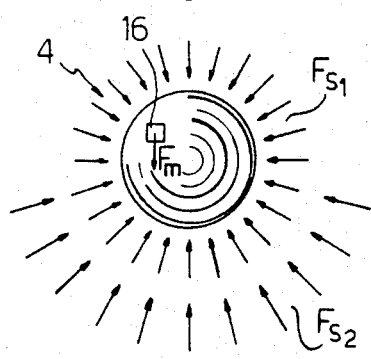

If, for example, the manner of generation of particles is that shown in FIG. 1 and each particle moves vertically in free fall, the two systems of forces can be chosen as has been indicated in FIG. 2. The body forces forming part of the second system of forces are constituted by the weight forces $F_m$ each of which is applied to an element 16 of the body and these are directed vertically downwardly. The surface forces forming part of the first system of forces are constituted by the surface tension forces $F^{s1}$ acting normally to the surface of the particle 4 and over the entire surface thereof. Other forces can be superimposed over these forces, such other forces also forming part of the first system of forces and being constituted by other surface forces $F_{s2}$ acting only on the lower part of the surface of the particle as shown in FIG. 2. Such forces can be generated, for example, by means of jets of a suitable fluid such as a gas directed on the said lower part of the particle.

Evidently if the intensity and direction of the forces $F_{s2}$ are suitably chosen the initial droplet from of each particle 4 can be corrected, making it assume a substantially spherical form.

Obviously, the forces forming part of the two indicated systems can be generated in a different manner. To correct the body forced $F_m$ (FIG. 2) due to the gravitational field, centrifugal forces can be utilized. The direction and intensity of such centrifugal forces will be selected taking account of the other forces which act on each particle 4 and which depend on the manner in which the particles have been generated, and the mass, speed and trajectory of these.

It is also possible to perform the process of the invention in a space in which the gravitational field does not act, or in which its intensity has been reduced by suitable means.

In a third phase of the process of the invention the heat of the particles 4 is removed sufficient to bring them to the solid state whilst they are in the configuration obtained in the preceding phase, that is to say while they are substantially spherical; this phase must therefore take place in a very short time in order to maintain each particle in the same spherical configuration due to the change of state.

Figure 3:
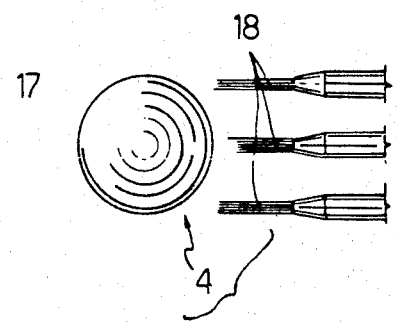

The third phase can take place in any convenient manner, for example, by making the particles 4 traverse a space (FIG. 3) in which this solidification takes place because of the physical and chemical conditions which obtain. To remove heat from the particles a jet 18 of fluid can be directed towards the particles, for example jets of gas or steam can conveniently be used.

The said third phase for removing heat from the particles 4 can also be performed by making the particles fall into a bath of suitable composition, constituted of a mixture of liquids and salts. In this way when the particles come into contact with the liquid in the bath, they are immediately cooled and solidified, thereby conserving the substantially spherical form which they had obtained at the end of the preceding phase.

If the cooling action on the particles obtained in this third phase is very energetic, as occurs when these are made to fall into a bath of the type indicated above, a simultaneous hardening treatment takes place which confers on the particles the chemical characterstics which they obtain with such treatment. In this case it will not be necessary to perform further heat treatment except for the tempering treatment.

At the end of the process described substantially spherical particles are obtained from which, with only a few supplementary operations, balls with mechanical characteristics and strict tolerances of form and dimensions can be obtained, such as are required for the balls of rolling element bearings. These operations can consist (when the hardening treatment is performed as indicated above during the course of the process) in a tempering treatment, and subsequently, a finishing grinding and polishing.

It is evident that the process described allows balls to be obtained at costs which are very much lower than those obtainable using the described conventional techniques, the metallurgical operations necessary to obtain the ingots suitable to be mechanically hot worked (such as casting, heating and the like) being completely eliminated as well as the mechanical operations performed on the hot ingots to convert these to rods, and the mechanical operations performed cold for removal of shavings or chips (cutting, pressing, shaping, rough grinding and the like) necessary to covert the rod into a ball. Moreover, the hardening treatment can be eliminated the particles being formed already hardened during the course of the process.

For the performance of these very many working phases, which are entirely absent in the process of the invention, a large quantity of energy is required as well as complex and expensive apparatus and installations for the operation of which particularly skilled operators are required.

Moreover, the mechanical strength of the balls thus obtained is particularly high because of the isotropy of the material and the absence of preferential orientation in the outermost fibres of the material of the balls.

I claim:

1. A process for the manufacture of steel balls for rolling element bearings comprising the steps of:
   (a) separating a plurality of particles of molten steel from a bath of molten steel and forming a current of particles in a gas atmosphere moving in a first predetermined direction,
   (b) subjecting these particles while still in the fluid state and moving in said gas atmosphere to the action of a gas stream directed towards said particles in a second direction opposed to the said first direction so as to modify the form of said particles and to impart to them a substantially spherical form, and
   (c) removing heat from the said particles while they have said substantially spherical from.

2. The process according to claim 1, including the step of:
   (a) allowing the molten steel to flow from the molten bath in an intermittent manner by free fall through orifices of predetermined dimensions so as to form a rain of molten steel drops.

3. The process according to claim 1, including the step of:
   (a) separating a plurality of particles from the bath of molten steel by forming a continuous and free flow of molten steel with a predetermined rate of flow, and
   (b) separating of a plurality of particles from the said free flow.

4. The process according to claim 3, including the step of:
   (a) separating the said particles from the said free flow by cyclically cutting the said free flow.

5. The process according to claim 4, including the step of:
   (a) separating the particles from the free flow by a laser beam.

6. The process according to claim 3, including the step of:
   (a) separating said particles from the said free flow by action of centrifugal force.

7. The process according to claim 1, including the step of:
   (a) separating a plurality of particles from the bath of molten steel by forming a stream of molten steel and causing the said stream to strike against suitable surfaces disposed along the direction of movement of the said stream.

* * * * *